No. 679,800. Patented Aug. 6, 1901.
F. H. TURNER.
CUTTING MACHINE.
(Application filed July 9, 1900.)
(No Model.) 2 Sheets—Sheet 1.
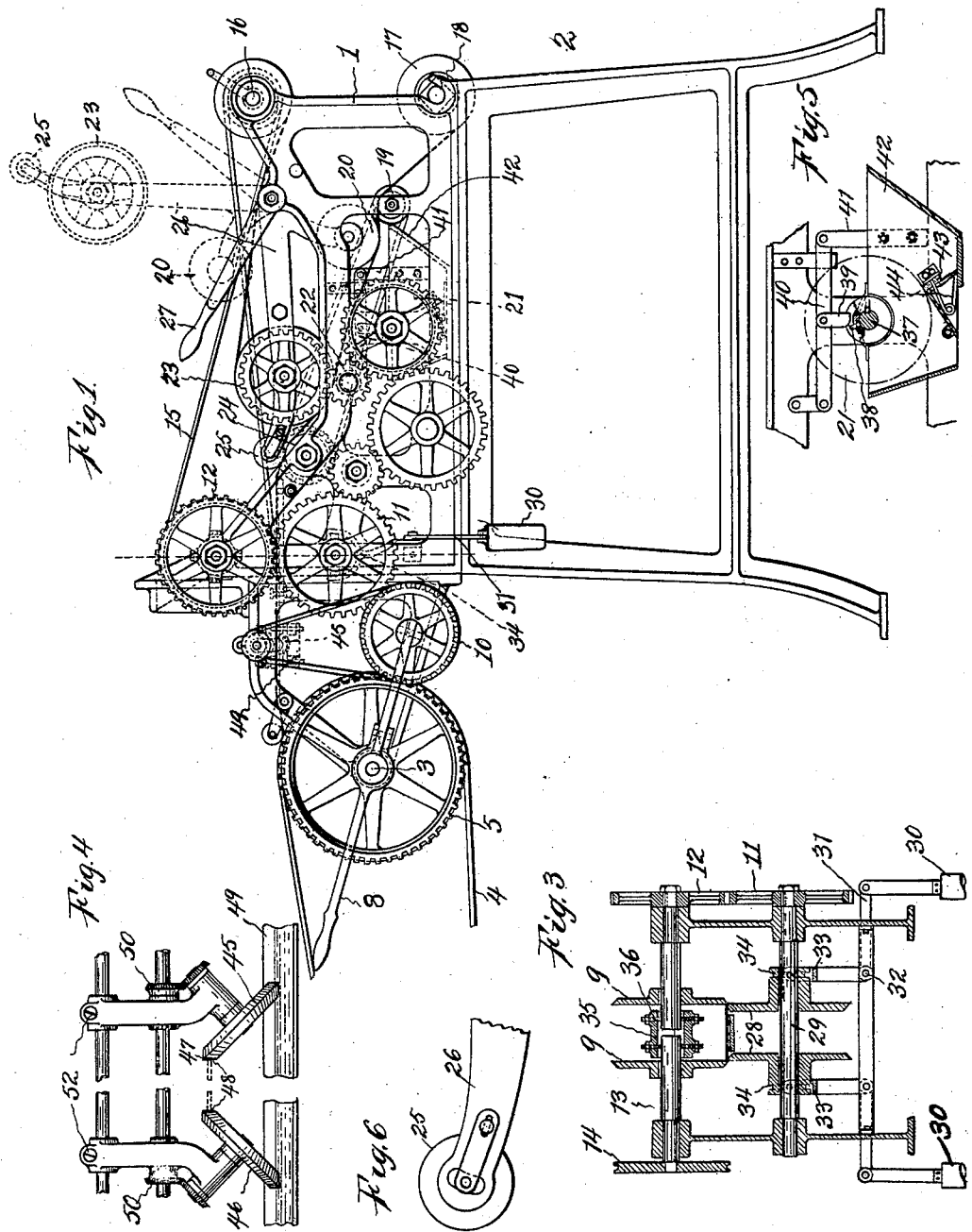
Witnesses
Luitgard Morba
J. E. Dimond
Inventor
Frank H. Turner
By W. E. Simonds
Attorney No. 679,800. Patented Aug. 6, 1901.
F. H. TURNER.
CUTTING MACHINE.
(Application filed July 9, 1900.)
(No Model.) 2 Sheets—Sheet 2.
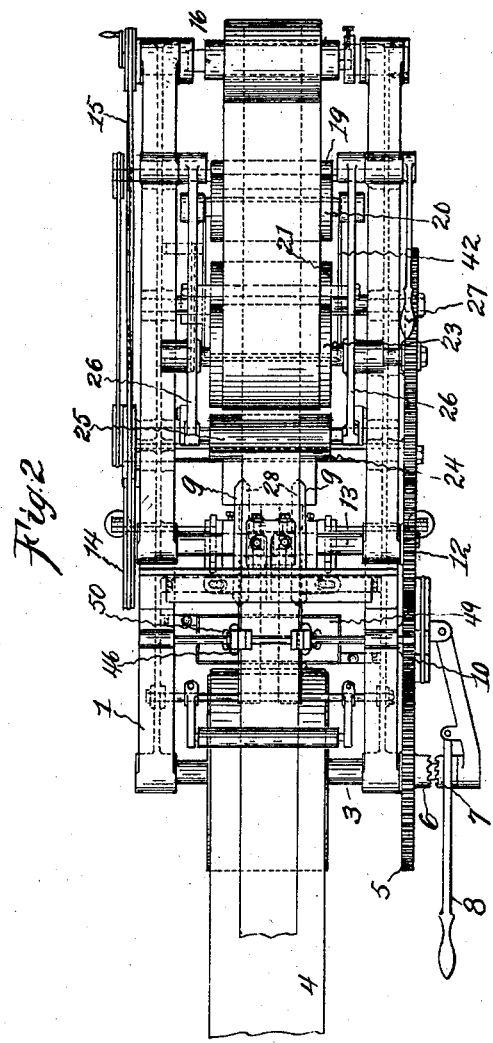
Witnesses
Luitgard Morka
J. O. Dimond
Inventor
Frank H. Turner
By W. G. Simonds
Attorney

UNITED STATES PATENT OFFICE.

FRANK H. TURNER, OF HARTFORD, CONNECTICUT.

CUTTING-MACHINE.

SPECIFICATION forming part of Letters Patent No. 679,800, dated August 6, 1901.

Application filed July 9, 1900. Serial No. 22,923. (No model.)

*To all whom it may concern:*

Be it known that I, FRANK H. TURNER, a citizen of the United States, residing at Hartford, in the county of Hartford and State of Connecticut, (having a post-office address at 738 Park street, Hartford, Connecticut,) have invented certain new and useful Improvements in Cutting-Machines, of which the following, when taken in connection with the accompanying drawings, is a description whereby any one skilled in the art may make and use the same.

While my improved machine may come under the general class of devices known as "cutting-machines" and may be used in connection with many sorts of materials, it is more especially adapted to be used in cutting or trimming a material which has been formed into a continuous strip and which it is desired to reduce in width to a fixed gage, having its edges regularly and cleanly cut and always in exact parallel relation. A machine of this class is found to be most desirable in cutting rubber or a like elastic material, and, in fact, the device illustrated in the accompanying drawings is designed more especially to be used on such a material.

In the manufacture of rubber, or rather of rubber articles, such as tubing, great difficulty has been experienced in cutting the two edges of the web of rubber so that as the abutting edges are brought together to form a tube there will be no unevenness between them. The rubber is first prepared and formed into a continuous web-like strip by suitable calendering-presses and while in its green condition is wound into a roll on a lining of cloth properly prepared to keep it from sticking together.

The object of my invention is to produce a machine which will automatically trim a continuous web of rubber to a predetermined width with its edges squarely and cleanly cut, leaving them always parallel. It also contemplates means for applying the cement or adhesive to the edges of the web after it has been cut to the required width, and this automatically.

Referring to the drawings, Figure 1 is a side view of my improved cutting-machine. Fig. 2 is a plan view of the same. Fig. 3 is a cross-sectional view through the cutters on an enlarged scale. Fig. 4 is a view, on an enlarged scale, of the gumming mechanism. Fig. 5 is a detail view of the box and appurtenant parts used for applying soapstone to the material. Fig. 6 is a detail view, on an enlarged scale, of the idler and guide-roll hereinafter described.

In the accompanying drawings the numeral 1 denotes a frame carrying the several mechanisms for holding, dusting, cutting, and gumming the material operated upon and the mechanism for rewinding the web of cloth or like material with which the rubber is wound into a roll before being placed on the frame. This frame 1 is mounted upon a suitable base 2. At one end of the frame 1 a main driving-shaft 3 is mounted in suitable bearings and is adapted to be driven by a belt 4, connected with any suitable source of power, and which serves not only as a driving-belt, but also as a carrier to transfer the strip of newly-cut rubber to any point where it is desired to subsequently use it. The shaft 3 bears at one end a main driving-gear 5, which operates the trains of gears which drive the several mechanisms hereinafter described. The gear 5 is loosely mounted on the shaft 3 and has on its hub one member of the clutch mechanism 6, which coöperates with a second clutch member 7, splined to the shaft and adapted to be moved into and out of engagement with the clutch member 6 by an operating-lever 8. This clutch mechanism forms a convenient means of starting and stopping the several mechanisms of the machine and is quite essential, as very often in the operation of the device, the material being somewhat sticky, it is necessary to stop the machine to adjust the web of cloth and the rubber, which have adhered to each other. The gear 5 drives the cutters 9 through gears 10, 11, and 12. At the opposite end of the cutter-shaft 13 is located a grooved pulley 14, which, through the medium of a belt 15, drives the winding-arbor 16, which is adapted to rewind the web of cloth upon which the rubber is introduced to the machine in a roll, as shown at 17.

The roll of cloth containing the rubber is placed in a bearing 18, as shown at the right of Fig. 1, and is then led over a roll 19 and under a roll 20 to the powdering-roll 21, where the rubber receives a coating of soapstone or like material, which prevents it from sticking to the several parts of the machine with which it comes in contact. From the powdering-roll 21 the cloth and rubber are led between two rolls 22 23, the cloth passing about the roll 23 to the winding-arbor 16, while the rubber is conducted between rolls 24 25, which separate it from the web of cloth for lining and feed it to the cutters 9. For convenience the rolls 20, 23, and 24 are mounted in a swinging frame 26, adapted to be turned by a hand-lever 27. The parts last named may be swung upward, as shown in dotted outline in Fig. 1 of the drawings, to facilitate starting the webs between the rolls. The rolls 24 25 are driven at a slightly greater speed than the roll 23, so that the rubber is stretched a little, and thus withdrawn from the web of cloth, to which it has been closely united. The belt-drive which operates the winding-spindle 16 allows of some slip and automatically takes care of the web of cloth. The roll 25, which is mounted in the end of the swinging frame 26, is adjustable both vertically and horizontally, as shown in Fig. 6, and by this adjustment the roll may be always placed in such a relation to the roll 24 as to guide the strip of rubber to the cutters.

The cutters 9 are mounted on the shaft 13 and positively driven by gearing, which are adjustable transversely to the axis of the shaft 13, as shown in Fig. 3. Below the cutters 9 and bearing against their inner faces are a pair of cutting-disks 28, splined to the shaft 29 and having a movement lengthwise thereof. These cutting-disks are held against the inner faces of the cutters 9 with any desired degree of pressure by weights 30, each dependent from the angle-lever 31, pivoted, as at 32, and bearing at its outer end a yoke 33, having pins coöperating with a groove 34, formed in the hub of the cutting-disk 28. To secure the angular adjustment of the cutting-disks 9, the coupling 35 is arranged connecting the two halves of the shaft 13 by pivot-screws 36, so that the two halves, with their cutting-disks 9, may be thrown slightly from axial alinement, thus bringing the edges of the cutters into contact with the edges of the cutter-disks 28 at a slight angle, which will produce a very desirable shearing cut upon the rubber or material which is being operated upon. This mechanism is an important feature of my improved machine, and heretofore the greatest difficulty has been experienced in automatically cutting elastic materials by rotary cutters or any other cutters, owing to the fact that such a material becomes wedged between the cutters and stretches to such an extent that a very imperfect cut is made.

The dusting mechanism referred to above is specially arranged for applying a coating of soapstone without liability of producing an excessive coating. The cylinder 21 of the dusting mechanism is mounted on a shaft 37, which is journaled in the frame 1, and which shaft bears a cam 38, adapted to strike against a lug 39, dependent from a shaker-bar 40, which is pivoted to the frame of the machine and connected to the dusting-box 42 through the medium of pivoted arm 41. This shaker-bar 40 imparts a sufficient movement to the dusting-box 42 to agitate the soapstone and keep it in constant contact with the roll 21, which extends only at its lower side into the box 42, and the surface of the roll is preferably covered with felt or like material. At the bottom of the box 42 and in position to be submerged by the soapstone a scraper 43 is arranged in contact with the surface of the roll 21 and is resiliently held there by a spring 44. This bar 43 rubs the soapstone well into the surface of the roll and at the same time prevents an excessive accumulation on it.

In Fig. 4 is illustrated a gumming mechanism for applying adhesive to the edges of the strip of rubber or material after it has been cut to gage. While this mechanism is not essential so far as the cutting-machine is concerned and may be used without the mechanism above described, it may be used to good advantage applied directly to the machine, as herein shown, when it is desired to form the strip of material into a tube. It comprises, essentially, a pair of beveled disks 45 46, mounted at an angle to each other and having faces 47 48, which bear against the edges of the material, as shown in dotted outline. The lower edges of these rolls are immersed in the adhesive contained in a box or trough 49. They are adapted to be driven by beveled gears 50, mounted on the shaft 51, and driven as by a belt and pulley. They are adjustable toward and from each other and may be set to any gage and then clamped, as by the set-screws 52.

I claim as my improvement—

1. In combination in a machine of the class specified, a driving and carrying belt, a main driving-wheel, means for supporting and guiding the material to be cut to the cutter, means for removing the lining said means being frictionally driven, and one or more cutters adapted to cut said material to any desired width.

2. In combination, in a machine adapted to cut a web of material which is introduced to the machine in contact with a second web of material, a swinging frame bearing rollers for conveying one of said webs to a winding-spindle and means for guiding the first-named web to the cutters, and cutters for cutting the web.

3. In combination in a machine including a cutting and winding mechanism, positively-driven feed mechanism for the material to be operated upon, and frictionally-driven winding mechanism for winding the carrying-web, and a belt for driving the driving-shaft adapted to receive and convey the cut material.

4. In combination in a machine for automatically cutting a strip of material, a pair of power-driven cutters, a pair of cutting-disks adjustable with relation to the cutters and adapted to be held in contact therewith with a forced yielding pressure.

5. In combination, in a machine for cutting a strip of material, a pair of rotary cutters standing in planes not truly parallel, parallel rotary cutter-disks mounted in operative relation to said cutters and held in yielding engagement therewith, gearing directly connecting the shafts of the cutting-disks, which shafts stand in a single plane, and means for driving them at corresponding speeds.

6. In combination, a pair of rotary cutters mounted upon a driving-shaft comprising two sections arranged with their axes disposed at an angle to each other, cutting-disks rotarily mounted in operative relation to the cutters and adapted to bear yieldingly against them to produce a shearing cut.

7. In combination, a pair of rotary cutters mounted upon a driving-axle, said axle being divided between the cutters, means connecting the two sections of the driving-shaft forming a coupling by which the cutters may be arranged at an angle to each other, and a pair of cutting-disks resiliently held against the cutters and coöperating with them to produce a shearing cut.

8. In combination in a machine of the class specified, the material to be cut and its lining-web suitably supported, mechanism for dusting the material to be cut and feeding it to the cutters, means for separating the lining-web therefrom and winding it up, and an adjustable guide-roll for guiding the material to be cut as it is separated from its lining, said feeding and winding mechanism traveling at different rates of speed.

9. In a machine for cutting strips of elastic material comprising a dusting, a feeding, and a cutting mechanism, rotary gummers whose edges apply an adhesive to the edges of the material after it has been cut and while it is in motion, said gummers being set oblique to the plane of the strip and having a rate of movement substantially equal to the rate of movement of the material, and means for adjusting said gummers to and from each other.

10. In a machine for cutting strips of material comprising feeding mechanism and a pair of rotary cutters operating with a shearing cut upon the moving material, means for applying an adhesive to the newly-cut edges of the material, said means including a pair of obliquely-disposed rotary disks having their edges cut to conform to the edges of the material which has been cut, and means for adjusting said disks obliquely to their axes but in a line parallel with the plane of said material.

FRANK H. TURNER.

Witnesses:
EDWARD M. YEOMANS,
LUITGARD MORBA.